United States Patent
Pelletier et al.

(10) Patent No.: US 8,472,991 B2
(45) Date of Patent: Jun. 25, 2013

(54) METHOD AND A BASE STATION FOR DETECTING LOSS OF SYNCHRONIZATION

(75) Inventors: Ghyslain Pelletier, Boden (SE); Riikka Susitaival, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 680 days.

(21) Appl. No.: 12/391,312

(22) Filed: Feb. 24, 2009

(65) Prior Publication Data

US 2009/0239566 A1    Sep. 24, 2009

Related U.S. Application Data

(60) Provisional application No. 61/037,931, filed on Mar. 19, 2008.

(30) Foreign Application Priority Data

Sep. 23, 2008  (SE) .................. PCT/SE2006/051060

(51) Int. Cl.
*H04B 7/00* (2006.01)
*H04B 1/38* (2006.01)

(52) U.S. Cl.
USPC .......................................... 455/517; 455/561

(58) Field of Classification Search
None
See application file for complete search history.

(56) References Cited

U.S. PATENT DOCUMENTS

| | | | |
|---|---|---|---|
| 2007/0286080 A1* | 12/2007 | Kim et al. ..................... | 370/236 |
| 2008/0285509 A1* | 11/2008 | Womack et al. .............. | 370/329 |
| 2009/0122736 A1* | 5/2009 | Damnjanovic et al. ....... | 370/311 |
| 2009/0239568 A1* | 9/2009 | Bertrand et al. .............. | 455/522 |

FOREIGN PATENT DOCUMENTS

| | | |
|---|---|---|
| EP | 1993302 A1 | 11/2008 |
| WO | 2007130324 A2 | 11/2007 |
| WO | 2008134614 A1 | 11/2008 |

OTHER PUBLICATIONS

3GPP. "Uplink Synchronisation Recovery" 3GPP TSG-RAN WG2 Meeting #55, Seoul, South Korea, Oct. 9-13, 2006. R2-062768. XP-002437989.
3GPP. "DRX and DTX in LTE_Active" 3GPP TSG-RAN WG2 Meeting #52, Athens, Greece, Mar. 27-31, 2006. R2-060967. XP-002463498.

* cited by examiner

*Primary Examiner* — Crystal L Hammond
(74) *Attorney, Agent, or Firm* — Coats & Bennett, P.L.L.C.

(57) ABSTRACT

The present invention relates to a method for detecting loss in DRX synchronization in a telecommunications system. The present invention further relates to a base station configured to perform the method for detecting the loss in DRX synchronization. The method comprises the steps of assigning radio resources to a UE for enabling the UE to send uplink information to the base station. The method further comprises the step of detecting loss in DRX synchronization when information that is expected by the base station is absent on the assigned resource(s).

26 Claims, 6 Drawing Sheets

METHOD AND A BASE STATION FOR DETECTING LOSS OF SYNCHRONIZATION

RELATED APPLICATIONS

This application claims priority to International Application No. PCT/SE2008/051060 filed on Sep. 23, 2008 and to U.S. Provisional Application No. 61/037,931 filed on Mar. 19, 2008, the contents both of which are incorporated herein by reference in their entirety.

TECHNICAL FIELD

The present invention relates generally to the field of wireless communications, and, more particularly, to a method and a base station for detecting loss of synchronization between the base station and a user equipment due to discontinuous reception (DRX).

BACKGROUND

The $3^{rd}$ Generation Partnership Project (3GPP) is responsible for the standardization of the UMTS (Universal Mobile Telecommunication Service) system, and LTE (Long term Evolution) is now under discussion as a next generation mobile communication system of the UMTS system. LTE is a technology for realizing high-speed packet-based communication that can reach a data rates of about 100 Mbps on the downlink and about 50 Mbps on the uplink. To this end, schemes and mechanisms are under discussions, for example, a scheme to reduce the number of network nodes in conventional UMTS networks. As an example, the base station in LTE, also known as eNB (enhanced Node B), will perform the functions of a conventional radio access network (RNC) node and of a UMTS Node B. In addition, eNBs in LTE will interact directly with the core network and with other eNBs Another ongoing work on the LTE network (i.e. on the UMTS Terrestrial Radio Access Network LTE (UTRAN-LTE), is a mechanism known as discontinuous reception (DRX) which is defined to save battery time and resources of user equipments (UE). With DRX, a UE can turn on and off reception of layer 1/layer 2 (L1/L2) control in radio resource control connected state or connected mode (RRC_connected). In order to save battery time, the connected mode UE, while being in sleep mode during a predetermined DRX cycle period, wakes up at specific timings in order to check/monitor for possible control channels allocated by the eNB to determine if there is data to receive. When there is no data to receive, the UE switches to the sleep mode and keeps the sleep mode until the next wake-up time. The control channel checked/monitored by the UE is known as PDCCH (Physical Downlink Control Channel). When there is data to receive, the UE receives the data from the eNB and sends a response signal (ACK/NACK) indicating a successful or a failure in the reception of the data transmitted based on a protocol known as HARQ (Hybrid Automatic Repeat Request) protocol. In the technical specification 3GPP TS 36.321 entitled: "*Evolved Universal Terrestrial Radio Access (E-UTRA) Medium Access Control (MAC) protocol specification*", the different timings/timers related to DRX, are defined. As an example, DRX uses one or two predefined cycles (long and/or short cycles) at the beginning of which the UE should monitor the PDCCH over a certain amount of TTIs (Transmission Time Interval) under a so called Active Time. During the Active Time, the UE monitors the PDCCH for PDCCH-subframe(s). The number of consecutive PDCCH-subframe(s) at the beginning of the DRX cycle (i.e. during the Active Time) is known as the "On-duration Timer". The On-duration timer in the beginning of each cycle also defines how long a UE should monitor the PDCCH. The PDCCH can carry both downlink assignments as well as uplink grants scheduled by eNB.

Whether the UE is awake (i.e. monitors the PDCCH) or is asleep after the On-duration period depends on activity, i.e. possible receptions of PDCCH control data during that period. In order to avoid unnecessary scheduling and to avoid wasting of radio resources, the eNB should know the state of the UE when transmitting downlink data to the UE. In other words, the eNB should know if the UE is in DRX or not. Therefore, it is defined in the above mentioned specification 3GPP TS 36.321 a set of rules for changing from the active state to DRX and back. An example of such a rule is where the UE fails in decoding the PDCCH successfully during the On-duration timer, i.e. there are no control data. In such an event, the UE enters the sleep mode i.e. from an active state to DRX state. If on the other hand, the PDCCH indicates DL transmission, the UE starts or restarts a so called DRX inactivity timer. It should also start to use the short cycle if it is configured and when the short cycle timer expires the use to the short cycle is stopped. It should also be mentioned that it is also defined in the specification that if a so called HARQ RTT (round trip time) timer stops in a TTI, the UE should start a retransmission timer.

Because the eNB and the UE generally have similar timers and knowledge of the beginning times of the cycles (long), the state (active, DRX) of the UE does not have to be signaled explicitly between the eNB and the UE. Therefore, as long as the eNB and the UE are state synchronized with each other, the conventional DRX mechanism works well. In other words, if there are no errors in the control channels i.e. if the UE always can decode the PDCCH when there is a DL assignment or an UL grant, the inactivity timers of the UE and of the eNB run in the same phase, and the UE continues monitoring of the PDCCH even if the On-duration timer expired. However, if there is an error in PDCCH reception, the eNB starts the inactivity timer while the UE does not and the state synchronization between the UE and the eNB is thus lost. Therefore, in this case, the UE enters DRX state, whereas the eNB assumes that UE is still awake and that the UE continues to monitor the PDCCH for another time period equal to at least the inactivity timer. Furthermore, the eNB can continue to transmit PDCCH control information and to assign transmission resources for DL data and/or grants for UL data, during the entire long cycle (which can be in the range of 200 ms or even more) by pipelining inactivity timers and retransmission timers, while the UE does not monitor any of aimed assigned resources. This will lead to a waste of radio resources that instead can be allocated for data transmissions for others UEs (or users). In addition, unnecessary radio transmissions produce interference in the cells of the network, e.g. in one or several neighbouring cells to the cell where the UE is currently located. Furthermore, if the short cycle is configured, the UE that is currently operating in the long cycle and that has missed the control signalling (PDCCH) due to error in PDCCH reception, will not switch to the short cycle as expected by the base station (or eNB).

SUMMARY

It is thus an object of the exemplary embodiments of the present invention to address the above mentioned problems and to provide a method and an apparatus corresponding to a base station, that allow detection of loss of state synchronization, i.e. loss of DRX synchronization, between the base station and a UE, thus minimizing interference in the network and avoiding unnecessary resource usage in the network.

According to a first aspect of embodiments of the present invention, the above stated problem is solved by means of a method for use in a base station, for detecting loss of DRX synchronization between the base station and a UE. The method comprises the steps of: assigning on a control channel, at least one radio resource to the UE for enabling the UE to transmit uplink information to the base station; and detecting loss of control signalling indicating loss of DRX synchronization when the information which is expected by the base station is absent on the assigned radio resource(s).

According to a second aspect of embodiments of the present invention, the above stated problem is solved by means of a base station configured for detection of loss of DRX synchronization between it and a UE. The base station comprises means for assigning on a control channel, at least one radio resource to the UE for enabling the UE to transmit uplink information. The base station further comprises means for detecting loss of control signalling indicating loss of DRX synchronization when the expected information from the UE, is absent on the assigned radio resource(s).

An advantage with the present invention is to avoid waste of resources in case DRX synchronization is lost.

Another advantage with the present invention is to reduce the amount of interference created in the network due to loss of synchronization.

Yet another advantage with the present invention is to minimize power consumption in a UE.

A further advantage with the present invention is to improve resource allocation in the network.

Still other objects and features of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

The different embodiments of the present invention are described herein by way of reference to particular example scenarios. In particular the invention is described in a non-limiting general context in relation to a communications network based on the third generation (3G) long term evolution (LTE) concept. It should be noted that the present invention is not restricted to 3G LTE but can be applicable in other wireless systems that employ discontinuous reception (DRX) such as WiMAX (worldwide interoperability for microwave access), or HSPA (high speed packet access) or WCDMA (wideband code division multiple access) or HSDPA (high speed downlink packet access) or HSUPA (high speed uplink packet access).

Figure 1:
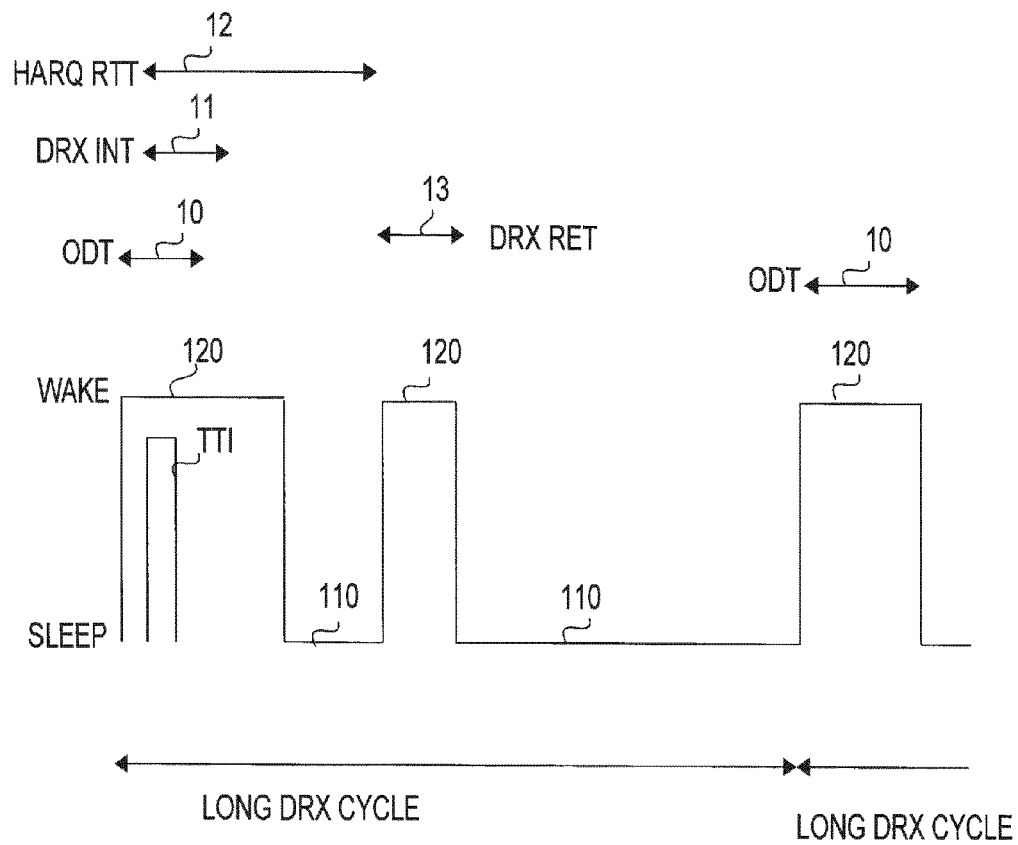
FIG. 1 is a diagram illustrating an example of a prior art DRX pattern when a UE successfully decodes a control channel.

Referring to FIG. 1, there is illustrated an example of a prior art DRX pattern when a UE (not shown) is assumed to have successfully decoded a control channel corresponding to a PDCCH channel. The UE is connected to a base station or a eNB or a Node B. It is also assumed that the UE and the base station previously agreed on a DRX configuration i.e. they have similar timers and knowledge of the beginning times of the cycles (long cycles or short cycles) and thus the state of the UE does not have to be signaled explicitly between the base station and the UE. Note that in FIG. 1 only long DRX cycles are exemplified for illustrative purposes. It should be noted, that in LTE, the same DRX mechanism is used for both UL and DL. In addition, the UE can be configured with a short DRX cycle which is a fraction of the long cycle (i.e. long DRX cycle=x*DRX short cycle), where x is a take any appropriate value based on the system wherein DRX is used.

In FIG. 1, the sleep mode and the wake (or active) mode of the periodic DRX cycle are indicated. The period 110 of the sleep mode indicates a period during which the UE turns off its receiver to minimize power consumption, e.g. this period is an opportunity for the UE to enter the DRX mode. The wake period 120 of the active mode means a period in which the UE turns on its receiver to perform a normal reception/transmission operation. Also depicted in FIG. 1 are different timers that are used in DRX. During the active period 120, the UE monitors the PDCCH for PDCCH-subframe(s). The number of consecutive PDCCH-subframe(s) at the beginning of the DRX cycle (i.e. during the Active Time) is known as the On-duration timer 10, denoted in FIG. 1 by ODT. The On-duration timer 10 in the beginning of each cycle also defines how long a UE should monitor the PDCCH over a certain number of TTIs (transmission time interval). A PDCCH-subframe may also be referred to as a TTI. The PDCCH can carry both DL assignments as well as UL grants scheduled by eNB. The TTI shown in FIG. 1 indicates the time during which the UE successfully decoded the PDCCH. Since in this case it is assumed that the UE successfully decoded the PDCCH, then the UE has knowledge when there are resources allocated to it, i.e. DL assignment(s) and/or UL grant(s). In such case, the Inactivity Timer of the UE and the Inactivity timer of the base station (or eNB) run in the same phase. The Inactivity timer 11 (denoted DRX INT in FIG. 1) in DRX defines the number of consecutive PDCCH subframe(s) (or TTIs) after successfully decoding the PDCCH indicating UL grant(s) and/or DL assignment(s) for the UE.

In FIG. 1 it is also illustrated the HARQ RTT timer (Hybrid ARQ round trip time timer) 12 which specifies the minimum amount of sub-frame(s) before a DL HARQ retransmission is expected by the UE. The DRX Retransmission timer 13 (denoted DRX RET) is also shown in FIG. 1. It should be mentioned that HARQ is a known technique for combining previously received data with retransmitted data without discarding the previously received data. More specifically, an HARQ receiving (Rx) entity determines the presence/absence of errors in a received packet, and sends a positive acknowledgement (ACK) signal or a negative acknowledgement (NACK) signal to an HARQ transmitting (Tx) entity according to the presence/absence of error(s). The HARQ Tx entity performs retransmission of the HARQ packet or transmission of a new HARQ packet according to the HARQ ACK/NACK signal.

Figure 2A:
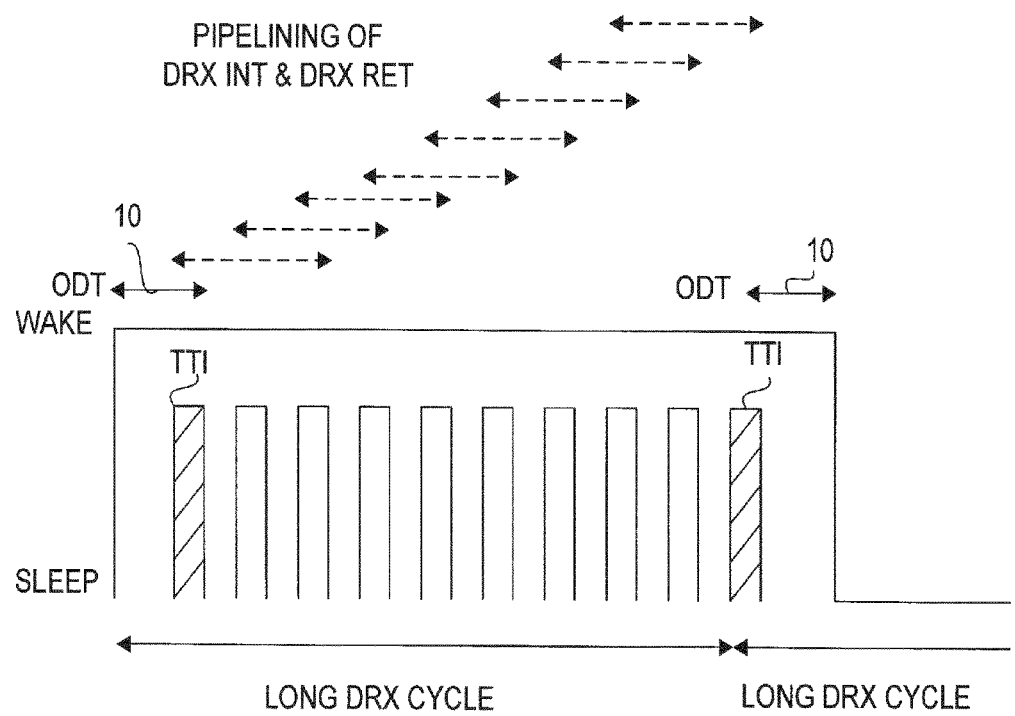
FIG. 2A is a diagram illustrating an example of prior art DRX pattern when a UE fails in decoding the control channel.

Referring now to FIG. 2A, there is illustrated the case where the UE decodes unsuccessfully the PDCCH causing loss in DRX synchronization. In this scenario, when there is an error in PDCCH reception by the UE, the eNB start the Inactivity timer while the UE does not. If the missed DL assignment(s) or UL grant(s) has been close to the end of the On duration timer 10 or is the last PDCCH sent by the eNB until the On-duration timer (ODT) 10 expires, the UE can enter DRX mode whereas the eNB assumes it to still be awake and to continue to monitor the PDCCH for another time period equal to at least the Inactivity timer. In FIG. 2A it is shown the case where the eNB continues to transmit PDCCH control information and to assign resources during the entire long cycle by pipelining Inactivity timers (DRX INT) and Retransmission timers (DRX RET), while the UE does not monitor any of aimed assignments. The indicated TTIs (dashed) in FIG. 2A correspond to TTIs where the PDCCH decoding is unsuccessful by the UE. The TTIs between those indicated (dashed) TTIs correspond to TTIs where the UE does not monitor the PDCCH but there is assignment(s) (DL assignment(s)). The scenario in FIG. 2A leads to that much radio resources are wasted. These wasted resources can instead be allocated for other users.

Figure 3:
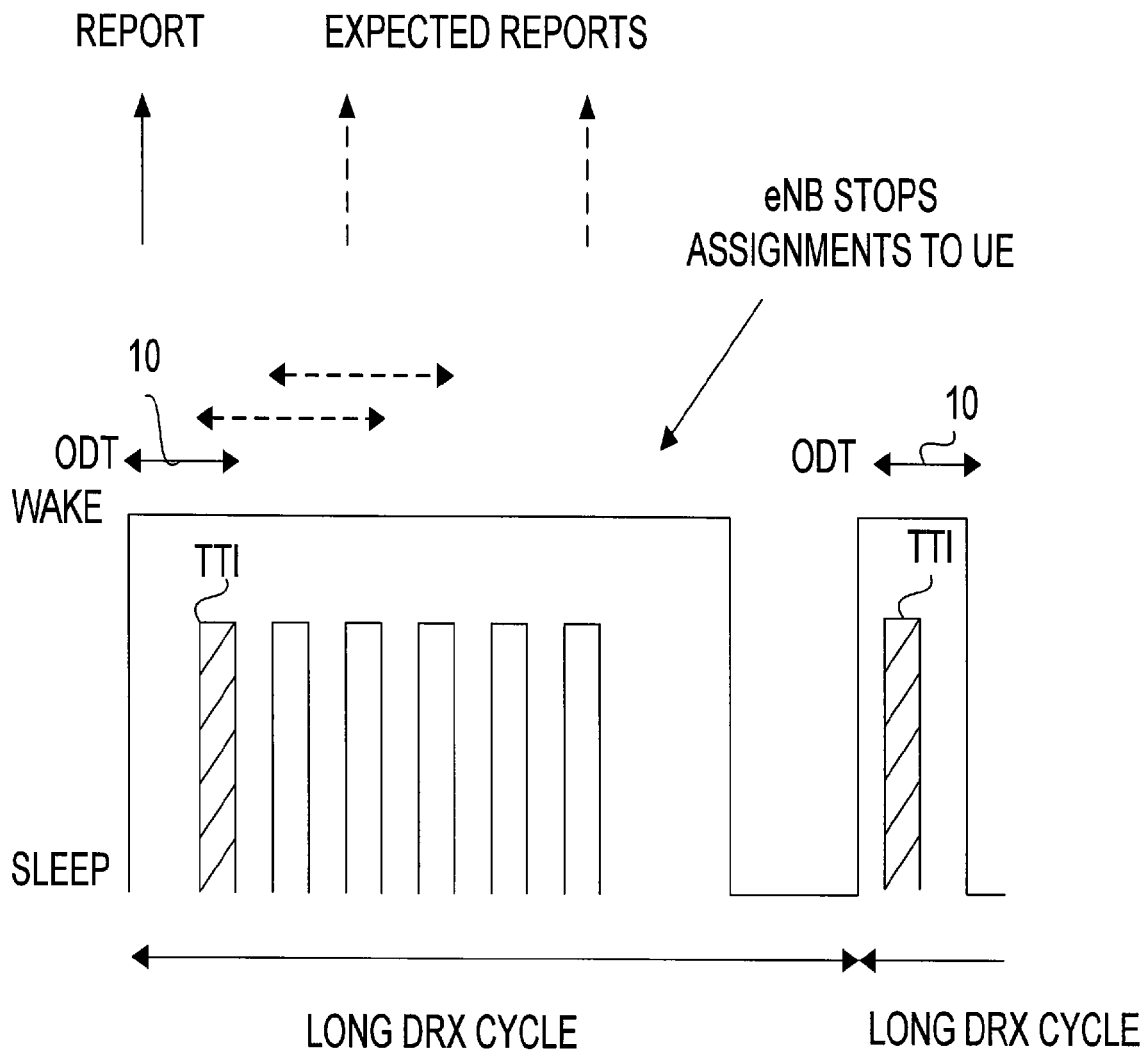
FIG. 3 is a diagram illustrating an example of a DRX pattern when a loss of DRX synchronization is detected in accordance with an exemplary embodiment of the present invention.

Referring to FIG. 3 and in accordance with an exemplary embodiment of the present invention, there is illustrated a DRX pattern in which the loss of DRX synchronization is detected by eNB. In this exemplary embodiment, the eNB is configured to assign to the UE, on a control channel (i.e. PDCCH), one or several radio resources for enabling the UE to send information on the uplink. The eNB expects from the UE on the uplink, information e.g. one or several radio link quality information reports required for e.g. error detection and if the report(s) is/are absent on the assigned resource(s), the eNB detects loss of control signaling indicating loss of DRX synchronization. As shown in FIG. 3, the eNB stops assigning resources for the UE when the expected reports are missing during the DRX cycle. The eNB is also configured to stop all timers that indicate that the UE is awake and stop the above mentioned assignments until a beginning of the next DRX cycle. By radio link channel quality information report is meant e.g. CQI report(s) and/or a sounding reference signal (SRS) report(s) and/or a precoding matrix index (PMI) report(s) and/or a rank indicator (RK) report(s).

According to an exemplary embodiment of the present invention, the one or several assigned resources on the control channel (i.e. the PDCCH) correspond to one or several dedicated physical uplink control channel (PUCCH) resources assigned in DL assignment(s)) on the PDCCH. According to another exemplary embodiment of the present invention, the one or several assigned resources correspond to one or several dedicated physical uplink shared channel (PUSCH) resources assigned in UL grant(s) on the PDCCH.

Figure 2B:
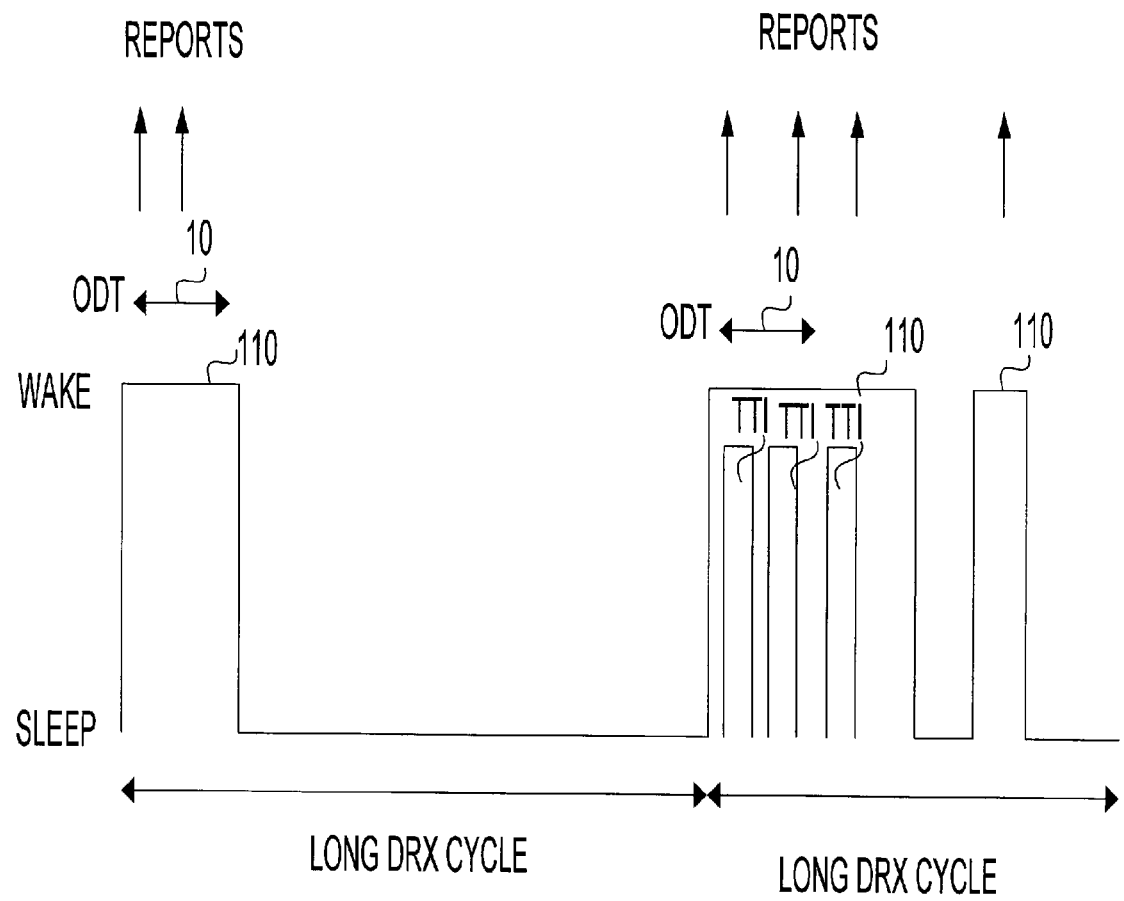
FIG. 2B is a diagram illustrating an example of a DRX pattern indicating information reported by the UE to a base station.

It should be noted that in LTE, the CQI, PMI and RI report(s) is/are sent on the PUCCH or the PUSCH, depending on whether there is simultaneous data or not, and the SR report(s) is/are sent in some assigned uplink sub-frame(s) in e.g. one several OFDM (orthogonal frequency division multiplexing) symbols according to a configuration of a so called sounding periodicity. The report(s) (e.g. CQI/PMI/RI/SRS) is/are transmitted by the UE to the eNB only during the active time period 120 (see FIG. 2B) e.g. during the On-duration timer 10 or other timers such as inactivity timer. The reporting can be performed periodically (e.g. as configured by the eNB on dedicated PUCCH resource(s)) or together with uplink data (i.e. on PUSCH resource(s) granted by the eNB), and thus report transmissions TTIs and resources are known by the eNB. Therefore, as long as the eNB and the UE are DRX synchronized, the eNB knows when to expect reports from the UE provided that the UE is in active time.

However, if the eNB assumes that the UE is not in active time while it detects e.g. a report on one or several assigned channels (e.g. PUCCH) then a loss of synchronization is present for the DRX states. In this scenario, the eNB was not expecting any reporting from the UE. Therefore, in accordance with embodiments of the present invention, the eNB detects loss of DRX synchronization when the information it expects from the UE is absent on assigned resource(s).

According to another example, the eNB detects an error in synchronization of the timers if it sees k reporting opportunities for which no information (e.g. CQI/SRS/PMI/RK) is reported by the UE, where k is at least equal to 1. Again, if the expected information is not received or is absent on the assigned resource(s), the eNB declares that loss of control signaling indicating loss of DRX synchronization is detected, and stops all timers that indicate that the UE is awake and also stops the assignments of radio resources to the UE until the beginning of the next DRX cycle. In FIG. 3, it is depicted the exemplary scenario where the number k of missing reports (e.g. CQI reports) required for error detection, is set to 2. As shown, after that the eNB has detected 2 missed reports, it stops assignments to the UE (DL assignments and/or UL assignments). As compared to the scenario in FIG. 2A, the number of assignments (DL or UL) for the given UE is less in this scenario (FIG. 3) since the eNB detected the loss of DRX synchronization and thus saves radio resources. If for example the DRX cycle (in this case the long DRX cycle) lasts for e.g. over hundreds of milliseconds, the solution provided by the above described embodiments of the present invention, significantly saves radio resources.

In FIG. 3, only the long cycle is illustrated. However, the present invention is not restricted to DRX long cycles. The DRX short cycle may also be used. As an example, if the expected reports (e.g. CQI/PMI/RI/SRS) are missing or absent due to PDCCH errors i.e. the UE does not decode the PDCCH successfully and does not start the DRX short cycle timer and to use the On-duration timer of it, the eNB detects loss of control signaling indicating loss of DRX synchronization and stops timers and further assignments and waits until e.g. next beginning of the long cycle before assigning again resources for the UE.

It should be mentioned that there is a trade off between the frequency of the reporting (i.e. CQI/PMI/RI/SRS reporting) configured by the eNB and how fast the eNB can detect PDCCH errors and loss of DRX synchronization. Frequent reports enable a faster detection of loss of DRX synchronization. In case the reporting is not very frequent, additional means to detect PDCCH reports are used. However, since the eNB knows when to expect a report on assigned resource(s), the eNB is capable of configuring resources for the reports and the frequency of the reporting and signals this/these to the UE.

According to another exemplary embodiment of the present invention, the eNB is also configured to detect loss of control signaling indicating loss of DRX synchronization when the expected information corresponding to HARQ feedback from the UE is absent on one or several assigned resources corresponding to PUCCH resource(s) in DL assignment(s). In other words, the eNB knows when to expect HARQ feedback from the UE and also knows what radio resources are used or will be used by the UE. For example, FDD (frequency division duplex) downlink uses asynchronous HARQ with acknowledgement transmitted a fixed time after reception of a downlink shared channel (DL-SCH) transport block and in LTE, the eNB expects the acknowledgment related to DL-SCH transmission in a subframe n to be received in e.g. subframe n+4. If the expected HARQ feedback is not received, the eNB detects loss in DRX synchronization. It should be mentioned that feedback resources are tied to the PDCCH control channel element used for assignment of DL resources (DL assignments).

For HARQ feedback in the UL, the eNB is further configured to detect a difference between discontinuous transmission (DTX) and non-acknowledgement (NACK) based on a detected/received energy level. This is because the HARQ UL feedback is an ACK/NACK feedback and not an ACK/DTX feedback. The ACK and the NACK have an energy level that can be detected by the eNB but the energy level of the DTX may be zero (no-transmissions). Therefore, the detected energy level can be used by the eNB to detect if DRX synchronization is lost or not.

Not that when the eNB assigns resource(s) to the UE for DL transmission (s), i.e. to enable the UE to receive data, the UE is expected to send a HARQ feedback (ACK/NACK) at a specific time relative to the DL assignment, and if no HARQ feedback is received, the eNB can assume that the UE has not heard the downlink assignment and that it is not synchronized with the UE behavior with regard to DRX. The eNB then stops all timers indicating that the UE is awake and stops assigning resources to the UE until the next DRX cycle.

According to yet another exemplary embodiment of the present invention; the loss of DRX synchronization can also occur in case the eNB assigns radio resources (e.g. uplink grants) to the UE, for enabling the UE to send data, but the UE fails to decode the PDCCH correctly or misses the PDCCH and resume DRX due to expiry of its timers. In this case, the absence of expected data transmissions from the UE on the granted uplink resources is detected by the eNB based on the energy level detected on these resources. Thus again, the eNB detects that DRX synchronization is lost and stops assigning resources to the UE until the next cycle.

It should be noted that the eNB is also configured to detect loss in DRX synchronization if the eNB detects DTX for a number of consecutive UL transmission opportunities for HARQ feedback, e.g. the eNB detects m TTIs (where m is at least equal to 1) with DTX on PUCCH and/or PUSCH dedicated resources for HARQ feedback. Also in this case, the eNB takes necessary actions to stop all timers and to stop assigning resources to the UE.

The above described exemplary embodiments of the present can also be combined. In other words, the eNB is also configured to detect loss of control signaling indicating loss of DRX synchronization between the eNB and the UE when information expected by the eNB from the UE corresponds to one or several radio link quality information reports (i.e. CQI/PMI/RI/SRS) in combination with the above mentioned HARQ feedback and/or UL transmissions for UL grants, is absent on the assigned resource(s).

In addition the exemplary embodiments of present invention are applicable for both long DRX cycle and short DRX cycle.

Figure 4:
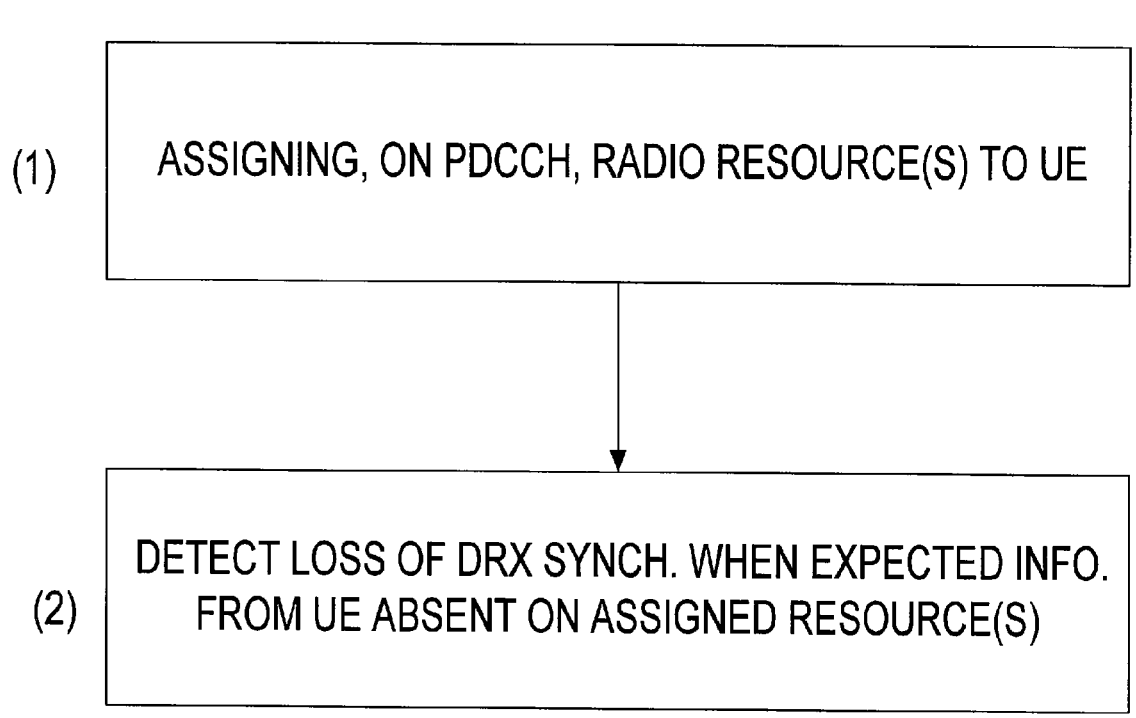
FIG. 4 is a diagram illustrating a flowchart of a method according to exemplary embodiments of the present invention.

Referring to FIG. 4, there is illustrated a flowchart of a method, performed by a base station (e.g. eNB, or Node B) for detection of a loss of DRX synchronization according to the previously described exemplary embodiments of the present invention. As shown in FIG. 4, the main steps of the method comprise:

(1) assigning, on a control channel (i.e. PDCCH) at least one radio resource to a UE for enabling the UE to transmit uplink information to the base station;

(2) detecting loss of control signalling indicating loss of DRX synchronization, when the information, which is expected from the UE, is absent on the one or several assigned radio resources.

As mentioned earlier, in the event that the base station detects the loss of DRX synchronization it stops all timers that indicate that the UE is awake and stops the assignments of radio resources to said UE until a beginning of a next DRX cycle.

Figure 5:
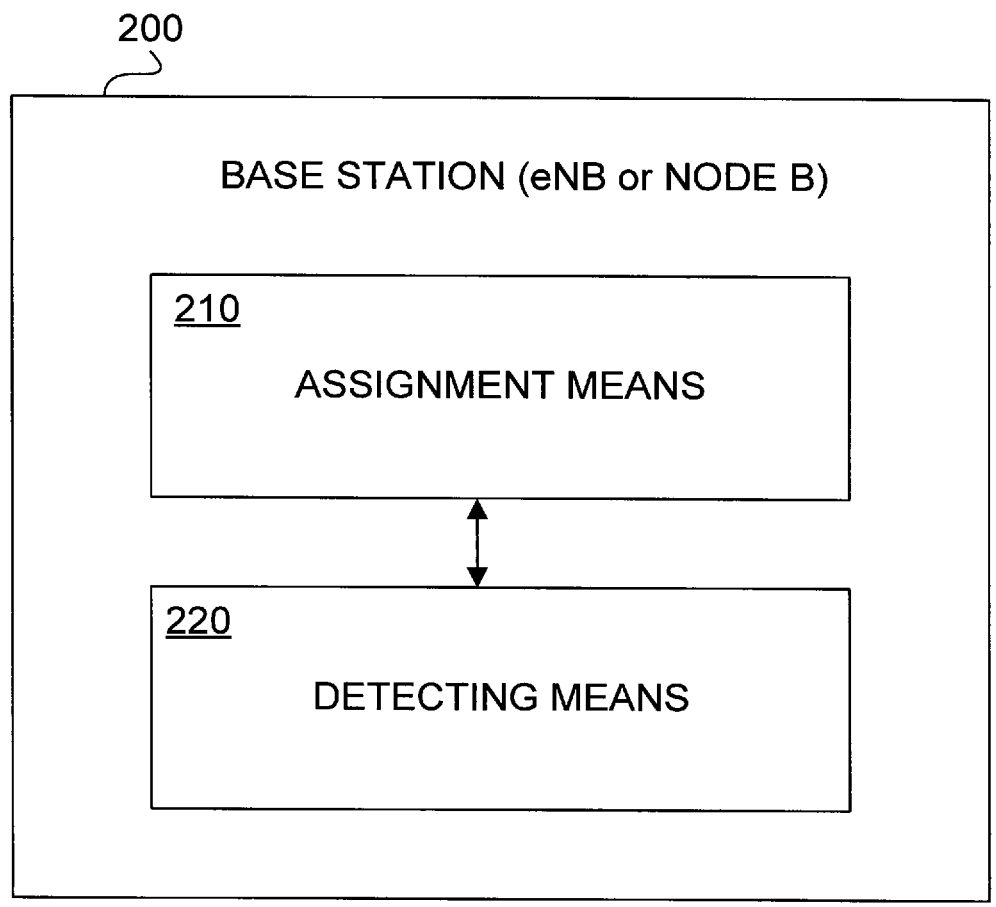
FIG. 5 is a block diagram illustrating an exemplary base station in accordance with exemplary embodiments of the present invention.

Referring to FIG. 5 there is illustrates a block diagram of an exemplary base station 200 for detection of loss in DRX synchronization. As shown, the base station comprises means 210 configured to assign, on a control channel, radio resources to a UE. The resources assigned are aimed to be used by the UE to send uplink information to the base station 200. The base station 200 further comprises detecting means 220 configured to detect loss of control signalling indicating loss of DRX synchronization, when the expected information is absent on the one or several assigned resources. The base station 200 is further configured to stop all timers indicating that the UE is awake, and to stop allocating/assigning any radio resource to said UE, due to loss of DRX synchronization, until the beginning of the next DRX cycle. The different means illustrated in FIG. 5 are not necessarily separated but can be in one or several blocks. Note that base station 200 is not restricted to the means shown in FIG. 5, i.e. base station 200 may comprise additional means, elements and components.

The present invention and its embodiments can be realised in many ways. For example, one embodiment of the present invention includes a computer-readable medium having instructions stored thereon that are executable by a base station (eNB or Node B) of a telecommunications system. The instructions when executed perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method for use in a base station, for detection of a loss of discontinuous reception (DRX) synchronization between the base station and a user equipment (UE), the method comprising:

assigning, by the base station, on a control channel, at least one radio resource to the UE for enabling said UE to transmit uplink information, unrequested by the base station, to the base station; and detecting, at the base station, loss of control signalling indicating loss of DRX synchronization, when the unrequested information which is expected from the UE is absent on said at least one assigned radio resource.

2. The method according to claim 1, wherein the step of detecting comprises detecting loss of DRX synchronization, when the expected unrequested information, corresponding to at least one radio link quality information report, is absent on said at least one assigned radio resource corresponding to a dedicated physical uplink control channel (PUCCH) resource during a current DRX cycle.

3. The method according to claim 1, wherein the step of detecting comprises detecting loss of DRX synchronization, when the expected unrequested information, corresponding to at least one radio link quality information report, is absent on said at least one assigned radio resource corresponding to a dedicated physical uplink shared channel (PUSCH) during a current DRX cycle.

4. The method according to claim 1, wherein the step of detecting comprises detecting loss of DRX synchronization, when the expected unrequested information, corresponding to at least one hybrid automatic repeat request (HARQ) feedback, is absent on said assigned radio resource corresponding to a dedicated physical uplink control channel (PUCCH) for HARQ feedback.

5. The method according to claim 1, wherein the step of detecting comprises detecting loss of DRX synchronization, when the expected unrequested information, corresponding to at least one radio link quality information report, is absent on said assigned radio resource corresponding to a dedicated physical uplink control channel (PUCCH) during a current DRX cycle, and a further expected unrequested information corresponding to at least one hybrid automatic repeat request (HARQ) feedback is absent on said assigned radio resource corresponding to a dedicated PUCCH for HARQ feedback.

6. The method according to claim 1, further comprising detecting loss of DRX synchronization, based on a received energy level detected on said at least one assigned radio resource corresponding to at least one uplink grant.

7. The method according to claim 1, further comprising detecting loss of DRX synchronization, when the expected unrequested information corresponding to uplink data is absent on said at least one assigned radio resource corresponding to at least one uplink grant on a dedicated physical uplink shared channel (PUSCH).

8. The method according to claim 1, further comprising, upon detecting the loss of DRX synchronization, stopping all timers that indicate that said UE is awake and stopping the assignment of radio resources to said UE until a beginning of a next DRX cycle.

9. The method according to claim 1, wherein said expected unrequested information corresponds to at least one radio link quality information report.

10. The method according to claim 9, wherein said at least one radio link quality information report comprises at least one channel quality indicator (CQI) report.

11. The method according to claim 9, wherein said at least one radio link quality information report comprises at least one precoding matrix index (PMI) report.

12. The method according to claim 9, wherein said at least one radio link quality information report comprises at least one rank indicator (RK) report.

13. The method according to claim 9, wherein said at least one radio link quality information report comprises at least one sounding reference signal (SRS) report.

14. A base station for detecting a loss of discontinuous reception (DRX) synchronization between the base station and a user equipment (UE), the base station comprising:

means for assigning, on a control channel, at least one radio resource to the UE for enabling said UE to transmit uplink information to the base station unrequested by the base station; and detecting means configured to detect loss of control signalling indicating loss of DRX synchronization, when the expected unrequested information from the UE is absent on said at least one assigned radio resource.

15. The base station according to claim 14, wherein said detecting means is configured to detect loss of DRX synchronization, when said expected unrequested information, corresponding to at least one radio link quality information report, is absent on said at least one assigned radio resource corresponding to a dedicated physical uplink control channel (PUCCH) during a current DRX cycle.

16. The base station according to claim 14, wherein said detecting means is configured to detect loss of DRX synchronization, when said expected unrequested information, corresponding to at least one radio link quality information report, is absent on said at least one assigned radio resource corresponding to a dedicated physical uplink shared channel (PUSCH) during a current DRX cycle.

17. The base station according to claim 14, wherein said detecting means is configured to detect loss of DRX synchronization, when said expected unrequested information, corresponding to at least one hybrid automatic repeat request (HARQ) feedback, is absent on said at least one assigned radio resource corresponding to a dedicated physical uplink control channel (PUCCH) for HARQ feedback.

18. The base station according to claim 14, wherein said detecting means is configured to detect loss of DRX synchronization, when said expected unrequested information, corresponding to at least one radio link quality information report, is absent on said at least one assigned radio resource corresponding to a dedicated physical uplink control channel (PUCCH) during a current DRX cycle, and a further expected unrequested information corresponding to at least one hybrid automatic repeat request (HARQ) feedback is absent on a assigned radio resource corresponding to a dedicated PUCCH for HARQ feedback.

19. The base station according to claim 14, wherein said detecting means is further arranged to detect loss of DRX synchronization based on a received energy detected on said at least one assigned radio resource corresponding to at least one uplink grant.

20. The base station according to claim 14, wherein said detecting means is configured to detect loss of DRX synchronization, when said expected unrequested information corresponding to uplink data is absent on said at least one assigned radio resource corresponding to at least one uplink grant on a dedicated physical uplink shared channel (PUSCH).

21. The base station according to claim 14, wherein the base station is further configured to, upon detection of the loss in DRX synchronization, stop all timers that indicate that said UE is awake and to stop assigning radio resources to said UE until a beginning of a next DRX cycle.

22. The base station according to claim 14, wherein said expected unrequested information comprises at least one radio link quality report information.

23. The base station according to claim 22, wherein said at least one radio link quality report information comprises at least one channel quality indicator (CQI) report.

24. The base station according claim 22, wherein said at least one radio link quality information report comprises at least one precoding matrix index (PMI) report.

25. The base station according to claim 22, wherein said at least one radio link quality information report comprises at least one rank indicator (RK) report.

26. The base station according to claim 22, wherein said at least one radio link quality information report comprises at least one sounding reference signal (SRS) report.

* * * * *